May 15, 1923. 1,455,411
C. E. RIEDEL
COUNTING SCALE
Filed March 23, 1921 2 Sheets-Sheet 1
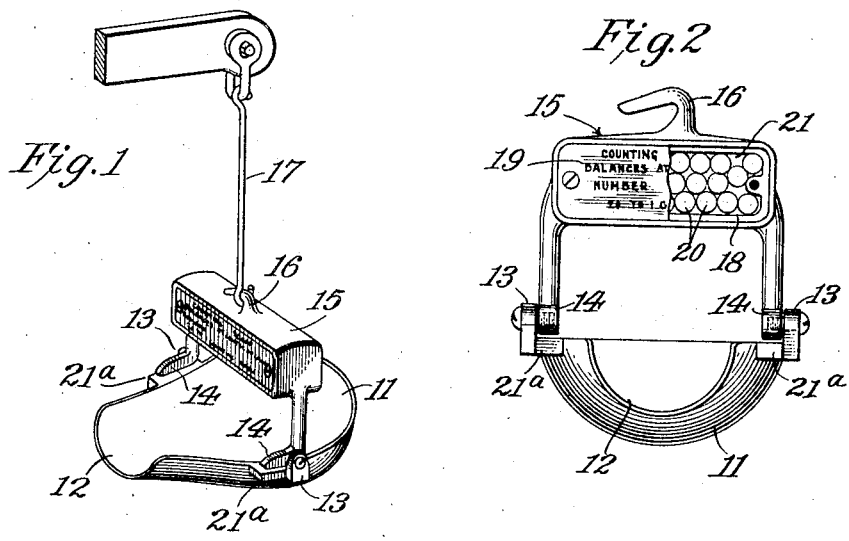
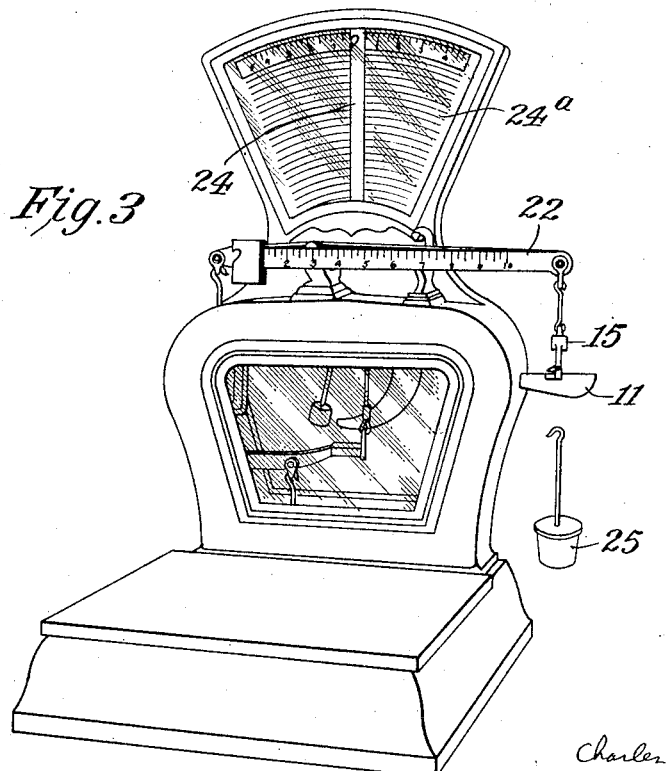
Inventor
Charles E. Riedel
By Attorneys
Kerr, Page, Cooper & Hayward May 15, 1923.
C. E. RIEDEL
1,455,411
COUNTING SCALE
Filed March 23, 1921    2 Sheets-Sheet 2
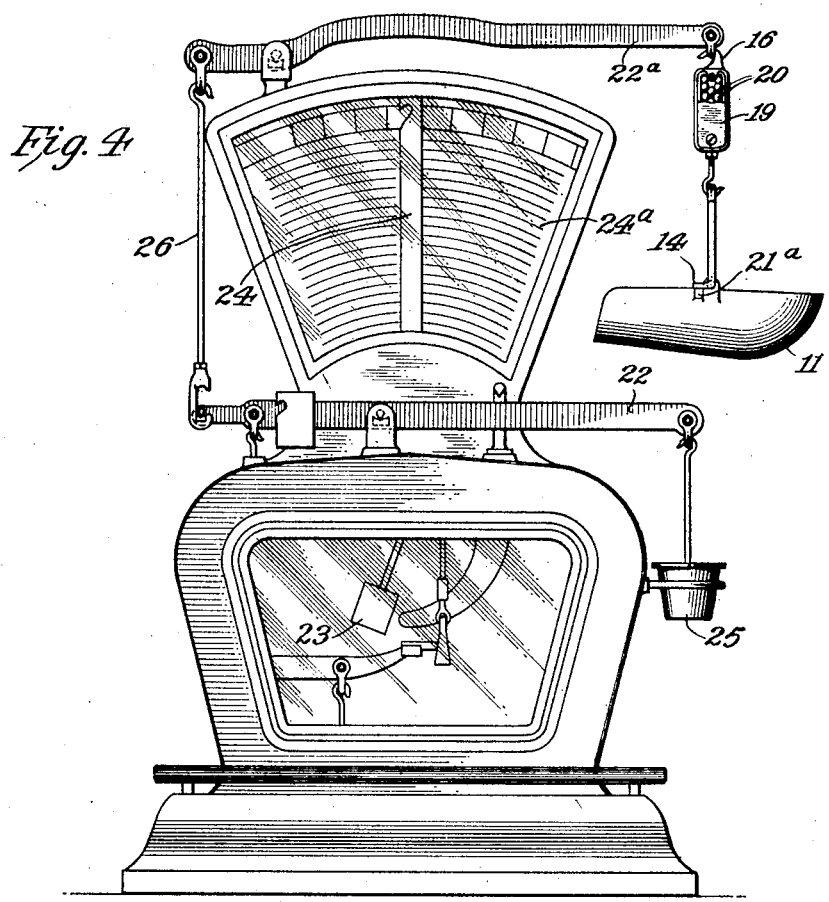
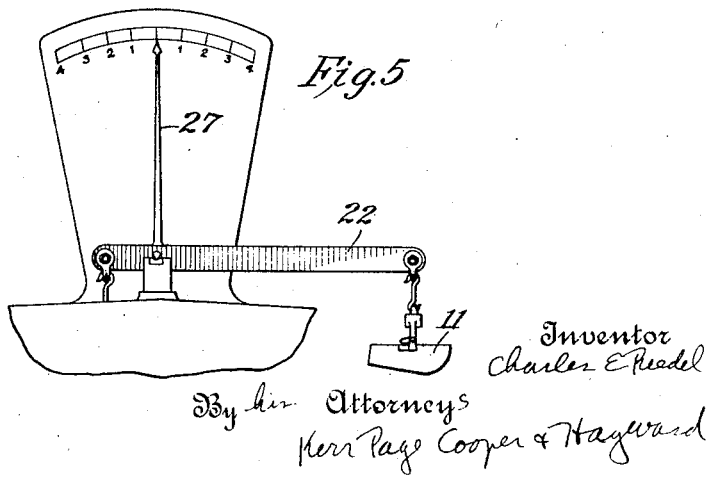
Inventor
Charles E. Riedel
By his Attorneys
Kerr Page Cooper & Hayward Patented May 15, 1923.

1,455,411

UNITED STATES PATENT OFFICE.

CHARLES E. RIEDEL, OF DETROIT, MICHIGAN, ASSIGNOR, BY MESNE ASSIGNMENTS, TO DAYTON SCALE COMPANY, OF DAYTON, OHIO, A CORPORATION OF NEW JERSEY.

COUNTING SCALE.

Application filed March 23, 1921. Serial No. 454,635.

*To all whom it may concern:*

Be it known that I, CHARLES E. RIEDEL, a citizen of the United States of America, residing at Detroit, in the county of Wayne and State of Michigan, have invented certain new and useful Improvements in Counting Scales, of which the following is a full, clear, and exact description.

This invention relates to "counting scales," for counting small articles of uniform weight. In scales of this type a small number of the articles, for instance screws, are balanced against a larger pile of the same articles. For example, with a scale having a weighing ratio of, say, 100:1, one screw in the receptacle carried by the counting beam or lever will balance a hundred screws of the same size on the platform. Hence if the screws on the platform are balanced by three in the receptacle or counting scoop, it immediately follows that the number on the platform is three hundred. While counting scales have been generally used in factories for counting small pieces these scales have usually been complicated and expensive and not adaptable for ordinary weighing operations.

The present invention has for its object the provision of attachment which may be used to convert a well known automatic scale into a counting scale. This attachment is of such character that it may readily be removed and replaced by the so-called shot cup whereupon the scale may be used for normal weighing or weighing and price computing purposes.

Other features of my invention pertain especially to the small receptacle or scoop in which the small number of articles are deposited, and its chief object is to provide a receptacle which can be "dumped" quickly and easily to empty it and which will return automatically to position for reloading. A further object is to provide a receptacle having provision for convenient adjustment of weight to balance the scale for counting purposes. To these and other ends the invention consists in the novel features hereinafter described.

One form of the invention is illustrated in the accompanying drawing, in which—

Fig. 1 is a perspective view showing the receptacle or receiver suspended from the counting beam of the scale.

Fig. 2 is a cross section of the bail by which the receiver is suspended, showing the pocket provided for small balancing weights.

Fig. 3 shows the counting scoop or receiver on place on the end of the scale beam converting the same into a counting beam. This figure also shows the shot cup which the counting scoop replaces.

Fig. 4 shows a scale having a supplementary lever system to change the multiple thereof for counting purposes. The counting scoop is carried by this lever system.

Fig. 5 shows the counting scoop used on a non-automatic beam type of scale having a near weight indicator.

The receiver 11, in which a few articles of the kind to be counted are placed, is in the form of a small scoop having a discharge spout or mouth 12, and is provided at its sides with upstanding lugs, as 13, by which it is pivoted to the heels of the feet 14 at the bottoms of the two legs of the bail 15. At the top of the bail is a hook 16 by which it may be removably suspended from the link 17. The transverse portion of the bail is formed with a laterally extending pocket 18, Fig. 2, closed by a removable cover 19, in which shot or slugs, as 20, may be placed to give the whole the proper weight, as will be readily understood. This cover may also bear brief information of any kind, for example, respecting the operation of the scale, its "counting ratio," etc. A blind cover or plate 21, of the same kind, can be provided on the back of the pocket, as a finish and to bring the legend more certainly to the user's attention.

The axis on which the scoop-shaped receiver 11 is pivoted to the bail-feet 14 is well forward of its center of gravity, that is, between its center of gravity and the spout 12. The result is that the receiver tends to swing clockwise (as viewed in Fig. 1) but is held in horizontal or receiving position by the lateral stops or abutments 21ª, which bear upwardly against the bail-feet, which latter extend toward the lighter half of the scoop. Hence the scoop remains in its operative position even when loaded. When the counting operation is completed the user simply tips the spout down, whereupon the articles slide out into his hand. Upon releasing the scoop it instantly swings back to normal position.

The scales to which the receiver or counting scoop may be attached are generally well known in the art and requires no detailed description. In Figs. 3 and 4, 22 is the pivoted scale beam connected with the platform in the usual manner. Scales of this type include an interconnected automatic counterbalance 23 and an indicator 24 swinging over a weighing and computing chart 24ª. The end of the beam 22 is provided with a swinging poise or shot cup 25. The scale shown in Fig. 4 also includes a supplementary steelyard 26 which may be connected or disconnected from the main beam 22. This steelyard connects with a supplementary beam 22ª here shown as the counting beam and having a different ratio than beam 22. The end of this beam carries the receiver 11 directly.

When the scale shown in Fig. 3 is to be used for counting purposes the shot cup 25 is removed and replaced by the empty receiver 11. Beam 22 now becomes a counting beam and the indicator 24 swings to mid position on the chart. The operator knowing the scale multiple which is say 20 to 1 and desiring to count out 100 articles places 5 of the articles in the receiver thereby displacing the indicator from its normal mid position. Articles are then added upon the scale platform until the scale indicator is restored to mid position. There then will be exactly 100 articles upon the platform.

The construction shown in Fig. 4 is utilized when counts are made which necessitate a high lever multiple. By removing the shot cup and connecting up the steelyard 26 to the beam 22 the multiple will be changed. Thereafter counting operations are carried out as heretofore explained.

The counting scoop also may be utilized on non-automatic beam scales of the type shown in Fig. 5. The scoop displaces the usual receiver and the articles are loaded on to the platform until the near weight indicator 27 stands at 0.

It is to be understood that the invention is not limited to the specific embodiment and use herein described but can be embodied in other forms and adapted to other uses without departure from its spirit as defined by the appended claims.

I claim:

1. In a combination counting and weighing scale in combination a support for the articles to be weighed, a graduated weight indicating chart, an indicator traversing the chart, means connecting said support with said indicator to actuate the latter, a main scale beam connected with the support and provided with means for alternatively receiving an article carrier, or a swinging poise, said beam when connected to said swinging poise reacting through the connections to cause the indicator to stand at zero on the chart, said beam when connected to an empty article carrier reacting through the connections to cause the indicator to assume a predetermined position away from zero on the charts.

2. In a combination computing counting and weighing scale, a support for the articles to be weighed, a graduated weight and price indicating chart, an indicator traversing the chart, a main scale beam and automatic counterbalancing means, means connecting the aforesaid beam, indicator and counterbalancing means with said support, a poise member adapted when connected to the main beam to cause the indicator to stand at zero upon the chart whereby the scale may be used for weighing and price computing operations and an article carrier adapted to replace the poise member and to cause the indicator to assume a position away from zero on the chart whereby the scale may be utilized for counting operations substantially as described.

3. In a combination counting and weighing scale having a support for the articles to be weighed, a graduated weight indicating chart, an indicator traversing the chart, a main scale beam, actuating means connecting the indicator, the main scale beam and the support, a poise member adapted when connected with the main beam to cause the indicator to stand at zero on said chart whereby the scale may be used for weighing and price computing operations, an article carrier adapted to replace the poise member and to cause the indicator to assume a position away from zero whereby the scale may be utilized for counting operations and replaceable balance weights carried by said carrier adapted to permit an adjustment of the weight thereof and thereby adjustably determine the position of the indicator relative to the chart when the carrier is in position upon said beam.

4. An article receiver for use in converting an automatic weighing scale to a counting scale by substituting the said carrier for a poise upon a beam of the scale, said carrier having provision to receive articles to offset applied loads, a pocket associated with said carrier to receive balancing weights whereby the weight of said carrier may be varied to the required value for counting purposes.

5. In a counting scale, the combination of a computing scale having a support for the articles to be weighed, a chart provided with a plurality of series of price graduations, an indicator traversing the chart, a counting beam, an article carrier thereon, means connecting the article support with the counting beam, said connection being adapted to cause the weight of articles in the article carrier to react through the counting beam against the weight of article carried by the support and a variable force-exerting counterbalancing means associated with the indicator and entirely independent of the article carrier and the weighted articles therein, said means exerting a variable counterbalancing force against the articles carried by the support and causing a variable displacement of the indicator over the chart whereby the scale can be used for weighing operations not involving counting and without the placing of weighty articles in the article carrier.

6. In a counting scale, the combination of a support for articles to be weighed, a graduated weight-indicating chart, an indicator traversing said chart, means connecting the said support with the indicator to actuate the latter, a counting beam, an article carrier on the counting beam, and means connecting the counting beam with the said support to give a predetermined ratio of leverage and thereby hold the said indicator at a predetermined intermediate graduation of the weight-indicating chart when the said article support and article carrier are in balance.

In testimony whereof I hereto affix my signature.

CHARLES E. RIEDEL.